United States Patent [19]

Nieson et al.

[11] 3,761,820

[45] Sept. 25, 1973

[54] PHASE SHIFT MODULATOR

[75] Inventors: Norman Nieson, Massapequa; Edward M. Barbach, Smithtown, both of N.Y.

[73] Assignee: The Singer Company, Little Falls, N.J.

[22] Filed: Mar. 20, 1972

[21] Appl. No.: 236,044

[52] U.S. Cl. .............. 325/163, 178/66 A, 332/9 R, 332/16 R

[51] Int. Cl. .............................. H04b 1/06

[58] Field of Search ................ 178/66 R, 66 A, 67; 325/30, 163; 332/9 R, 9 T, 10, 16 R, 16 T

[56] References Cited

UNITED STATES PATENTS 2,994,790 8/1961 Delaney .......................... 332/9 R

*Primary Examiner*—Charles E. Atkinson
*Assistant Examiner*—R. Stephen Dildine, Jr.
*Attorney*—S. A. Giarratana et al.

[57] ABSTRACT

The phase shift of a carrier frequency as a function of data information is achieved by applying a first frequency signal to a multistage frequency divider to produce a reduced frequency output signal that constitutes the carrier frequency. Each stage of the frequency divider includes a binary device which is switched between its two stable states by the signal passing therethrough. The phase of the signal at each stage can be changed by 180° by changing the stable state of the stage independently of the signal passing therethrough with the resulting amount of phase shift of the carrier signal being determined by the location of the stage in the frequency divider. One or more of the stages can have their stable states so changed to produce the required phase shift of the carrier signal. A serial data train is sequentially decoded to provide one or more signals indicative of the decoded data which signals are gated to one or more of the frequency divider stages to switch their stable states so that the carrier frequency is phase shifted as a function of the serial data train.

11 Claims, 10 Drawing Figures

PHASE SHIFT MODULATOR

BACKGROUND OF THE INVENTION

1. Field of the Invention

This invention relates to modulation and more particularly to a method and apparatus to provide multistate phase modulation.

2. Description of the Prior Art

In the transmission of binary signals by a phase modulated carrier frequency, it is apparent that the transmission of a single binary bit requires only two phase shifts or conditions, i.e., one corresponding to a ZERO and the other to a ONE. When a plurality of binary bits are transmitted at one time as a group, the respective groups may comprise different combinations of individual binary bits. Accordingly, each different combination requires a distinctive phase shift. For example when two binary bits (dibits) are transmitted as a group, four distinctive phase shifts are required to identify the combinations of 00, 01, 10 and 11. Additionally, when three binary bits (tribits) are transmitted as a group, eight distinctive phase shifts are required to identify the combinations of 000, 001, 010, 011, 100, 101, 110 and 111.

One prior art phase modulator is shown by U.S. Pat. No. 3,553,368 to utilize an oscillator to provide the required carrier frequency. The output of the oscillator is simultaneously applied to a number of parallel circuits which correspond to the number of phase shifts required. Each circuit phase shifts the carrier applied thereto by a different amount. By selectively switching the phase shifted signals of the parallel circuits onto a common lead in succession, a multi phase modulated signal is obtained which corresponds to the information contained in a binary data train. Although such prior art phase modulators operate satisfactorily, the present invention relates to a new and novel phase modulator which, because of its simplicity, is economical and reliable.

SUMMARY OF THE INVENTION

Briefly described, the present invention discloses shifting the phase of a carrier frequency as a function of data information by the novel use of a frequency divider. A first frequency signal applied to the input of the frequency divider produces a lower frequency at the output which is utilized as the carrier frequency signal. The frequency divider comprises a plurality of interconnected binary devices each of which is switched between its two stable states by the frequency signal passing through the frequency divider. Each bistable device thus functions as a two's counter to divide the frequency of the signal applied thereto by half. Additionally, switching of the binary devices independently of the frequency signal shifts the phase of the frequency signal passing therethrough by 180°. This causes the phase of the carrier signal to be shifted by an amount determined by the location of the bistable device in the frequency divider. Such independent switching of the bistable divices to shift the phase of the carrier signal is accomplished by first decoding a predetermined portion of a serial data train to obtain one or more voltage levels representative of the information decoded. Where decoding results in more than one voltage level, the voltage levels are sequentially applied to their respective binary devices to prevent interfering with one another while initially shifting the phase of the carrier. Additionally, the decoded voltage levels are gated to switch the stable states of predetermined bistable devices out of phase with the switching of the stable states of the binary devices caused by the frequency signal passing through the frequency divider. By successive decoding and gating, the carrier frequency is phase shifted as a function of the information contained in the serial data train.

BRIEF DESCRIPTION OF THE DRAWINGS

These and other features, advantages and operation of the present invention are described in detail hereinbelow in conjunction with the following described drawings, in which like reference numerals designate like or corresponding parts throughout the several figures, and in which.

DESCRIPTION OF A PREFERRED EMBODIMENT

Figure 1:
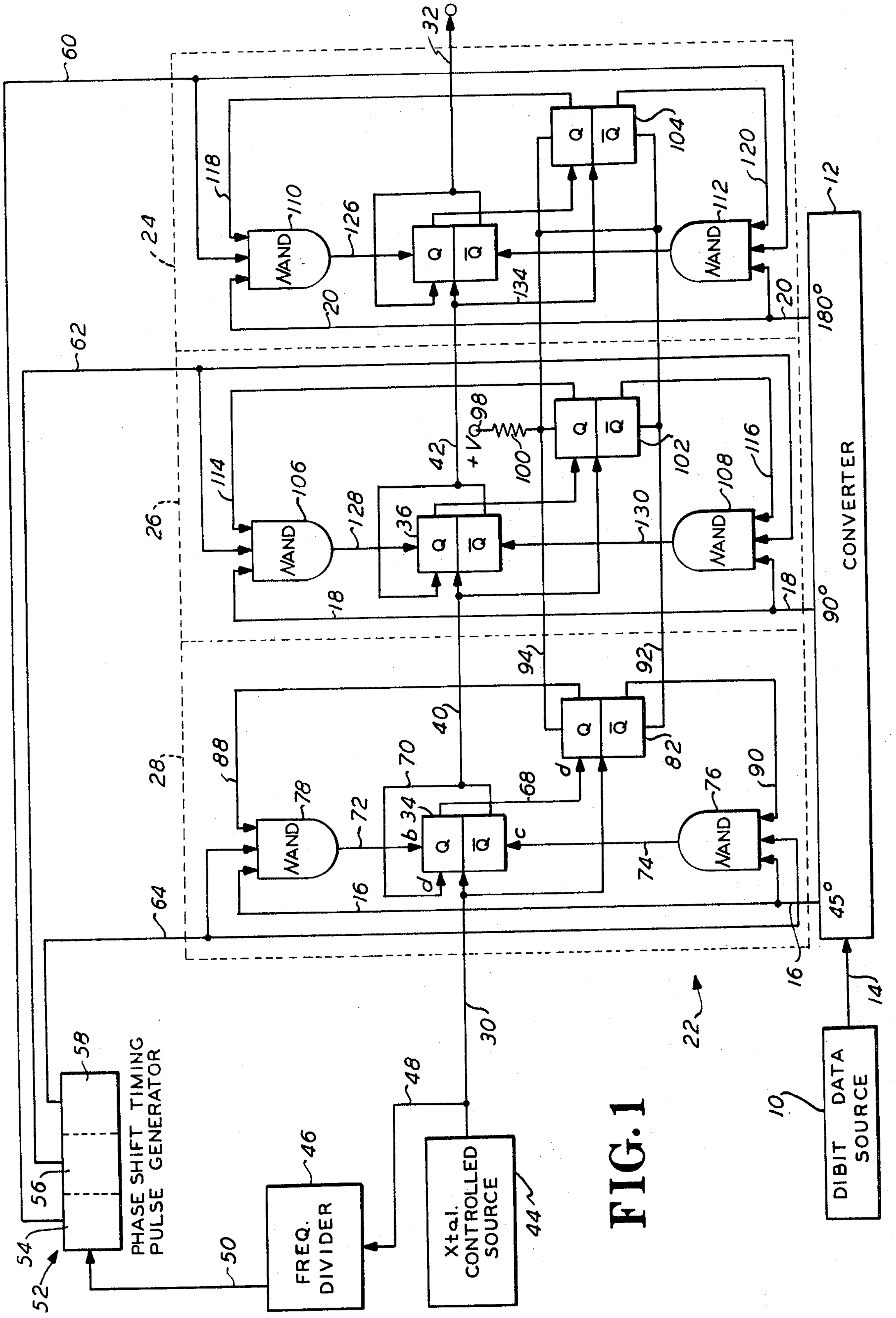
FIG. 1 is a logic and block diagram of a preferred embodiment of the present invention.

Referring now to FIG. 1, there is shown a serial, binary, data train source 10 which data train contains information to be transmitted as phase shifts of a carrier frequency signal. For purposes of describing the present invention, it will be assumed that two adjacent binary bits (dibits) of the serial data train are transmitted as a group. This results in four possible combinations of binary bits, each of which must be identified by a different phase shift. The four possible combinations and their identifying phase shifts used with the apparatus of the present invention are set forth here-inbelow.

| Dibits 1st bit 2nd bit | Phase Shift |
|---|---|
| 00 | 45° |
| 01 | 135° |
| 10 | 225° |
| 11 | 315° |

For purposes of describing the present invention, a binary ONE is also referred to as a positive voltage level or a voltage level that is "high". Correspondingly, a binary ZERO is also referred to as a negative voltage level or a voltage level that is "low".

The serial, binary data train provided by the source 10 is applied to a serial to parallel binary converter or decoder 12 by way of the lead 14. The converter 12, which is described in detail hereinbelow in conjunction with FIGS. 6 and 7, functions to successively convert pairs of binary bits (dibits) of the serial data train into one or more output voltage levels indicative of the binary bits decoded, which voltage levels appear on predetermined ones of the output leads 16, 18 and 20. For example, in the absence of any binary data on the lead 14, or the dibits 00, output lead 16 is high and will result in a 45° phase shift. When high, output lead 18 will result in a 90° phase shift and output lead 20 will result in a 180° phase shift, as is described below. It is noted that, except for the 45° phase shift, these phase shifts do not correspond to the phase shifts set forth in the table above. However, a 45° phase shift added to a 90° phase shift results in a phase shift of 135°, a 180° phase shift added to a 45° phase shift results in a phase shift of 225° and a phase shift of 45° added to phase shifts of 90° and 180° results in a phase shift of 315°. Accordingly, when the dibits 00 are decoded, only lead 16 is high. Further, decoding of the dibits 01 results in leads 16 and 18 being high, decoding of the dibits 10 results in leads 16 and 20 being high, and decoding of the dibits 11 results in the leads 16, 18 and 20 being high.

The decoder 12 output is coupled to a multistage counter or frequency divider 22 with lead 16 coupled to the first stage 28, the lead 18 coupled to the second stage 26 and the lead 20 to the third stage 24. A first frequency signal applied to the input of the frequency divider by way of lead 30, appears as a reduced frequency, carrier signal on the output lead 32 of the frequency divider. Each stage 28, 26 and 24 of the frequency divider includes a bistable device 34, 36 and 38, respectively. The first frequency signal on lead 30 constitutes the input to the first binary device 34 which has its output coupled to the input of the second binary device 36 by way of a lead 40 which in turn has its output coupled to the input of the third binary device by way of lead 42. The output of the third binary device appears on lead 32 as the carrier frequency output of the frequency divider. Each binary device is switched between its two stable states by the frequency signal passing therethrough in a well known manner. Each cycle of frequency signal at a binary device results in a single change from one stable state to another. Accordingly, each bistable device is a two's counter that reduces the frequency of a signal applied thereto by half. For the three stage 28,26 and 24 frequency divider 22 of FIG. 1, this results in the first frequency signal on input lead 30 appearing on output lead 32 reduced in frequency by a factor of 2×2×2, a factor of eight.

The first frequency signal appearing on the lead 30 is preferably a square wave supplied by a crystal controlled source 44 which may include a crystal controlled oscillator the output of which is applied, in a well known manner, to one or more flip-flops to produce the required square wave, first frequncy signal on lead 30. In accordance with a preferred embodiment of the present invention, the signal on lead 30 had a frequency of 14,400 cycles per second to produce a carrier signal on the lead 32 of 1,800 cycles per second.

The first frequency signal on lead 30 is also applied to another frequency divider, or converter 46, by way of a lead 48 to be divided by a factor of twelve, in any number of well known ways, to appear on the output lead 50 of the frequency divider as a square wave of 1,200 cycles per second. This is the same rate at which the input dibit data occurs at the input of the decoder 12.

The square wave signal on lead 50 is applied to a phase shift timing pulse generator 52. As is described hereinbelow in detail in conjunction with FIGS. 4 and 5, the phase shift timing means contains three stages 54, 56 and 58 respectively, and functions to provide, for each cycle of input, three sequentially occurring phase shift timing signals. For example, each cycle of input to the pulse generator 52 results in a narrow output pulse appearing on the lead 60 from the first stage 54. As soon as the pulse on lead 60 terminates, a narrow pulse appears on the lead 62 from the second stage 56 and termination of this pulse results in another pulse appearing on the lead 64 from the third stage 58. As is described hereinbelow in detail, the occurrence of the pulse on the lead 60 will cause the phase of the signal passing through the bistable device 38 of stage 24 of the frequency divider 22 to be shifted by 180° if the lead 20 from the decoder 12 is also high. Likewise occurrence of the phase shift timing pulse on lead 62 at the same time that the lead 18 from the decoder is high shifts the phase of the signal passing through the bistable device 36 of stage 26 by 180° resulting in a 90° phase shift of the carrier signal on lead 32. In a like manner, occurrence of the phase shift timing pulse on the lead 64 at the same time that lead 16 from the decoder is high shifts the phase of the signal passing through the bistable device 34 of stage 28 by 180° resulting in a 45° phase shift of the carrier signal on lead 32.

Each stage 28, 26 and 24 of the frequency divider 22 preferably includes a "D" flip flop as the binary device. As is well known, such flip flops include a set side Q and a reset side $\overline{Q}$. When the flip flop 34 is set, the potential on lead 68 from the set side is high and the potential on lead 70 from the reset side is low. Correspondingly, when the flip flop is reset, the potential on lead 70 is high and the potential on lead 68 is low. In operation the reset output on lead 70 is coupled to the d input of flip flop 34. When toggled, the set side Q will go to the state of the D input. Since the reset side $\overline{Q}$ is always the inverse of the set Q side, this insures toggling of flip flop 34 by each cycle of input. In accordance with a preferred embodiment of the present invention, the flip flop 34 is toggled by the positive going potential of an input cycle. The flip flop can be switched between its two stable states independently of the input on lead 30. For example, if the flip flop is reset, a negative potential on lead 72 to the preset input will set the flip flop and if the flip flop is set, a negative potential on lead 74 to the clear input will set the flip flop. As will be apparent to those skilled in the art and as described in detail hereinbelow, changing the state of the flip flop by a negative potential on leads 72 or 74, enables the phase of the signal passing through the flip flop to be changed by 180°.

The lead 72 constitutes an output lead for a NAND gate 78 which has as inputs, the output from stage 58 of the phase shift timing pulse generator appearing on lead 64, the output from the decoder appearing on lead 16, and the output appearing on lead 88 from the set Q side of another D flip flop 82. The lead 74 constitutes an output lead for another NAND gate 76 which also has as inputs, the output from the phase shift timing pulse generator appearing on the lead 64 and the output from the decoder appearing on lead 16. The third input, however is the output from the reset side $\overline{Q}$ of the other flip flop 82 appearing on the lead 90. Each of the NAND gates 76 and 78 are enabled when any one of their inputs is high and are actuated when all of thier inputs are high. Since each NAND gate is coupled to opposite sides of the other flip flop 82, only one NAND gate 76 or 78 can be actuated at any one time. When actuated, the output of the NAND gate is negative.

The other flip flop 82 has its d input coupled to the set Q output from the flip flop 34 appearing on the lead 68. Also, the first frequency signal appearing on the lead 30 is also coupled to toggle the other flip flop 82 by way of the lead 80. A positive going potential will always toggle the other flip flop 82 to a state opposite to that which the flip flop 34 is toggled by the same positive going potential. For example, assume that the flip flop 34 is set. This causes the input to the set side of the other flip flop 82 to be high. At the same time, the input to the set side of the flip flop 34 by way of lead 70 is low. Accordingly, the next occurrence of a positive going potential on lead 30 resets the flip flop 34 and sets the flip flop 82.

The construction and operation of the remaining stages 26 and 24 of the frequency divider 22 is substantially identical to that described and need not be repeated. It is noted, however, that the reset $\bar{Q}$ output of a preceeding flip flop constitutes the toggle input to a subsequent flip flop. Also the phase shift timing pulse generator output on lead 62 is coupled to stage 26 of the frequency divider 22 and the phase shift timing pulse generator output on lead 60 is coupled to stage 24 of the frequency divider. Further, the set and reset sides of the flip flops 82, 102 and 104 are coupled to a source 98 of positive potential by way of a resistor 100. This insures that flip flops 82, 102 and 104 will operate in a normal manner to provide proper enabling signals for associated NAND gates 76 or 78, 106 or 108, and 110 or 112, respectively.

Briefly described, the operation of the apparatus of FIG. 1 is such that the serially occurring dibit data on lead 14 is converted by the decoder 12 into one or more positive voltage levels that enable predetermined ones of the NAND gates associated with the frequency divider 22 flip flops 34, 36 and 38. At a rate equal to the rate that the dibit data occurs, the phase shift timing pulse generator produces a group of three, consecutively occurring phase shift timing signals to actuate the enabled NAND gates associated with the frequency divider flip flops. This results in a selective shifting of the phase of the signal passing through the frequency divider so that the phase of the carrier output signal is a function of the dibit data applied to the decoder 12.

Figures 2A, 2B:
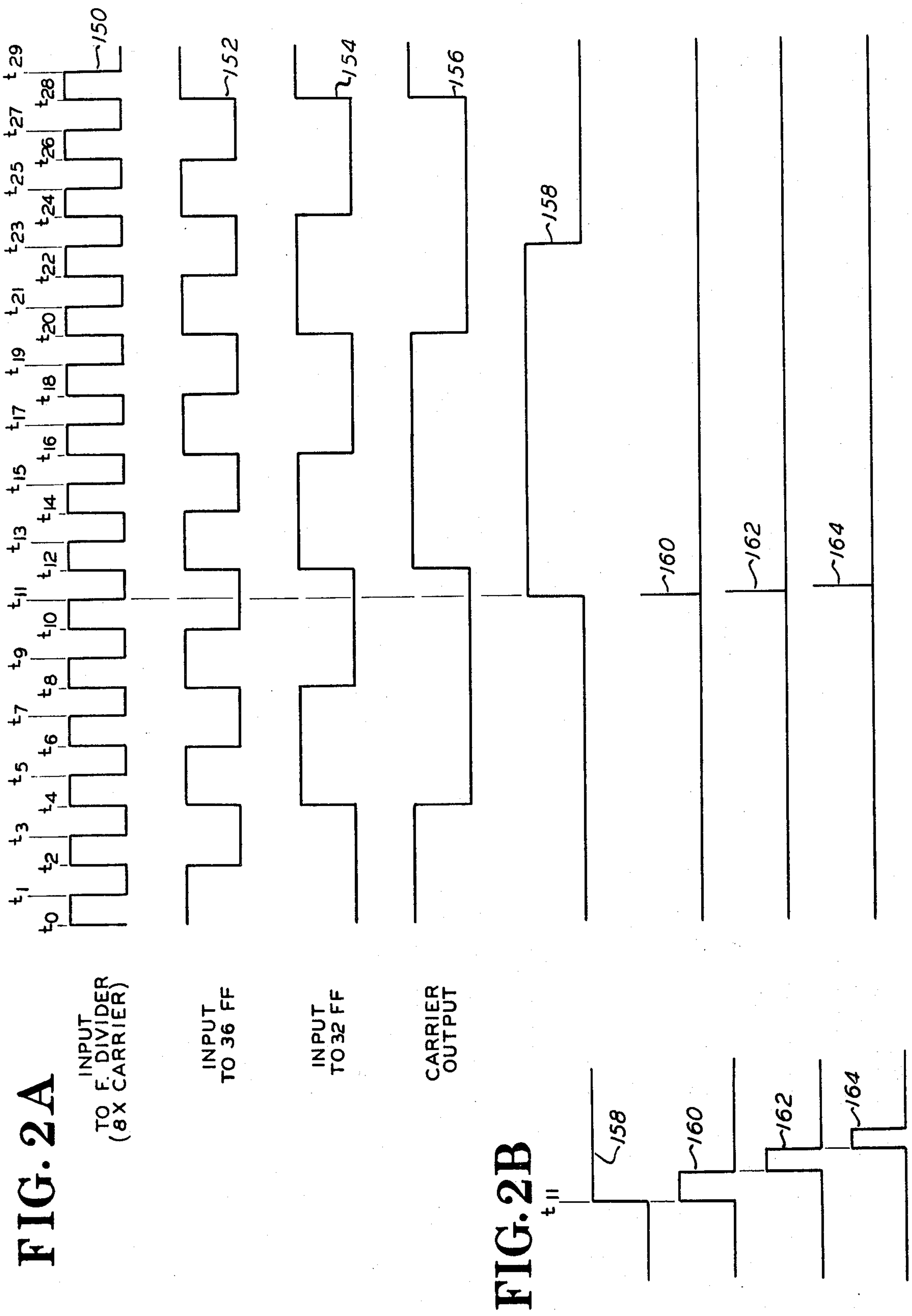
FIGS. 2A and 2B illustrate phase and timing diagrams for the apparatus of FIG. 1.

Referring now to FIGS. 1 and 2A, and assuming that there is no output from the decoder 12 on lead 16, 18 or 20, the 14,400 cycle per second square wave input to the frequency divider is shown by waveshape 150. At even time intervals, *t*0, *t*2, *t*4, etc., this input waveshape is a positive going potential that toggles flip flop 34 of the frequency divider 22. The output from the reset side $\bar{Q}$ of the flip flop 34 is shown by the waveshape 152 and constitutes the input to the flip flop 36. As shown, the frequency of this signal 152 is half that of the first frequency input signal 150. The frequency of the signal 152 is further reduced by half by flip flop 36 of the frequency divider 22, the output of which is shown by the waveshape 154 which is also the input to flip flop 38. The output from flip flop 38, shown by waveshape 156, constitutes the carrier frequency signal and has a frequency equal to half of the signal 154 frequency applied to the flip flop 38. As described above, as the flip flops 34, 36 and 38 are toggled by the frequency signal passing through the frequency divider 22, the associated complimentary flip flops 82, 102 and 104, respectively, are also toggled but are in states (set or reset) opposite to that of their associated flip flops.

Waveshape 158 constitutes the 1,200 cycle output of the other frequency divider 46 which is also the input to the phase shift timing pulse generator 52. As shown by FIG. 2A, this signal is a positive going potential at time *t*11, an odd time interval, and is negative going at time *t*23, also an odd time interval. The other signals, 150, 152, 154 and 156, however, representative of the frequency signal passing through the frequency divider 22, always change state at even time intervals *t*0, *t*2, *t*3, *t*6 etc. The potential level change of signal 158 can be achieved by fabricating the other frequency divider 46 from a plurality of flip flops that toggle in response to a negative going potential applied thereto, or, alternatively, by inverting the signal 150 applied to the input of the frequency divider 46. As shown by FIGS. 1 and 2A, each time the potential level of signal 158 goes positive, a first narrow pulse 160 appears on lead 60 from stage 54 of the phase shift timing pulse generator, followed by a second narrow pulse 162 on lead 62 from stage 56, followed by a third narrow pulse 164 on lead 64 from stage 58. This group of three pulses, sequentially occurring, are more clearly shown in FIG. 2B which has a greatly expanded time base with relation to FIG. 2A. As shown in FIG. 2B the leading edge of pulse 158 coincides with the positive going potential of the pulse 160, the leading edge of pulse 162 coincides with the trailing edge of pulse 160 and the leading edge of pulse 164 coincides with the trailing edge of pulse 162. As shown by FIG. 2A, these three sequential, phase shift pulses occur between times *t*10, and *t*12; a time period during which none of the flip flops of the frequency divider 22 are being toggled by the frequency signal passing therethrough. In accordance with one embodiment of this invention, the pulses 160, 162 and 164 each had a width of a few hundred nanoseconds.

Pulse 160 is applied to NAND gates 110 and 112 by way of lead 60, pulse 162 to NAND gates 106 and 108 by way of lead 62, and pulse 164 to NAND gates 78 and 76 by way of lead 64. The occurrence of these pulses determine the time interval during which the NAND gates can be actuated to change the state of the associated flip flops to shift the phase of the carrier signal by the desired amount. As clearly shown by FIG. 2A, the phase shift timing pulses 160, 162 and 164, and any resulting switching of the associated flip flops 38, 36 and 34, respectively, occur out of phase with the switching of the frequency divider 22 flip flops 34, 36 and 38 by the frequency signal passing through the frequency divider.

Figure 3A:
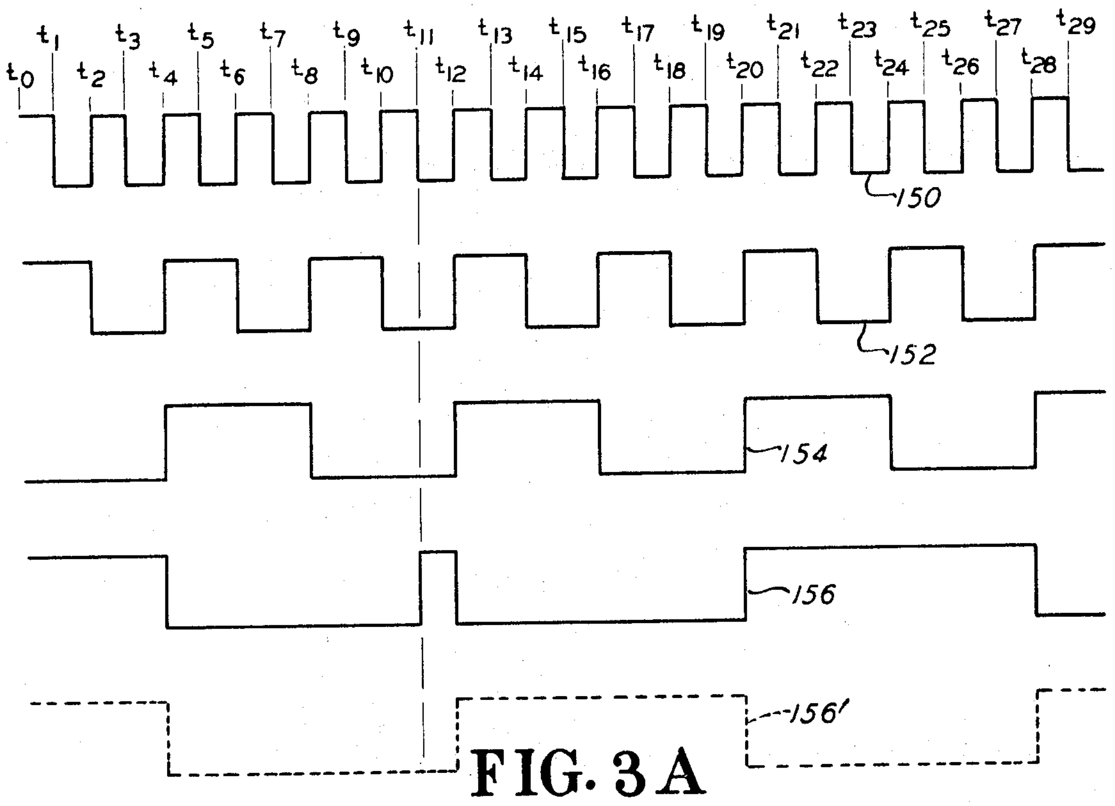
FIGS. 3A, 3B and 3C illustrate phase and timing diagrams for a carrier phase shift of 180°, 90° and 45° respectively, by the apparatus of FIG. 1.

Shifting the phase of the carrier signal by 45°, 135°, 225° and 315° can best be described by showing how a phase shift of 180°, 90° and 45° is accomplished. Referring now to FIGS. 1, 2B and 3A, assume that the output from the decoder 12 on lead 20 is high and leads 18 and 16 are low. At time *t*11, the shift pulse 160 occurs on lead 60 and constitutes one input to each of the NAND gates 110 and 112. These gates also have an input comprising the output from the decoder 12 on lead 20, which is positive. Assume that the flip flop 38 is set, thus causing the complimentary flip flop 104 to be reset. Therefore the set output from the complimentary flip flop appearing on lead 118 is low and prevents the NAND gate 110 from being actuated. However the reset output from the complimentary flip flop 104 appearing lead 120 is high resulting in all three inputs to NAND gate 112 being high which results in actuation of NAND gate 112 for the duration of the shift pulse 160. When NAND gate 112 is actuated, lead 124 coupled to the reset side of flip flop 38 is low and (as described hereinabove) causes the flip flop 38 to be reset. This is shown in FIG. 3A by waveshape 156 which is the reset output from flip flop 38, i.e., the carrier frequency output. Just prior to time *t*11, flip flop 38 being set causes its reset output 156 to be low. After time *t*11, actuation of NAND gate 112 resets flip flop 38 causing its reset output 156 to go high. Subsequently, at time *t*12, the toggle input to flip flop 38 is a positive going potential which toggles flip flop 38 back to a set condition. In the absence of the resetting of flip flop 38 at time 11, flip flop 38 would normally be reset at time *t*12. However, due to actuation of NAND gate 112 at time *t*11, the output of flip flop 38, has been shifted in phase by 180°. This is clearly illustrated in FIG. 3A by the dotted waveshape 156', which illustrates the carrier frequency signal when NAND gate 112 is not actuated and waveshape 156 which illustrates the carrier when NAND gate 112 is actuated at time *t*11. Reference to these waveforms shows that they are in phase prior to time *t*11 but 180° out of phase subsequent to time *t*11.

Since the output from the decoder on leads 18 and 16 is low, NAND gates 108 or 106 and NAND gates 76 or 78 cannot be actuated upon occurrence of phase shift pulses 162 and 164, respectively and the carrier is phase shifted 180°.

There is no way of knowing whether the flip flop 38 will be set or reset at the time of occurrence of the phase shifting pulse 160. However, the outputs on leads 118 and 120 from the complimentary flip flop 104 are such that only the NAND gate 110 or 120 that results in reversing the stable state of the flip flop 38 is actuated. Further, the complimentary flip flop 104 was reset prior to time *t*11 and remains reset after time *t*11. However, prior to time *t*11 the d input to the set side of the complimentary flip flop 104 by way of lead 132 is high due to flip flop 38 being set, subsequent to time *t*11 however this potential goes low due to flip flop 38 being reset at time *t*11. Accordingly, the next positive going potential at time *t*12 on leads 42 and 134 has no effect on the state of the complimentary flip flop 104 which remains reset but will toggle the flip flop 38. Accordingly, the complimentary flip flop 104 continues to be in a stable state opposite to that of its associated flip flop 38. Additionally, since the complimentary flip flop 104 remains reset, the continuing occurrence of the shift pulse 160 for a time after flip flop 38 has changed to its reset state can have no further effect since the complimentary flip flop 104 outputs will cause only the NAND gate 112 to be actuated during the occurrence of the shift pulse 160.

Figure 3B:
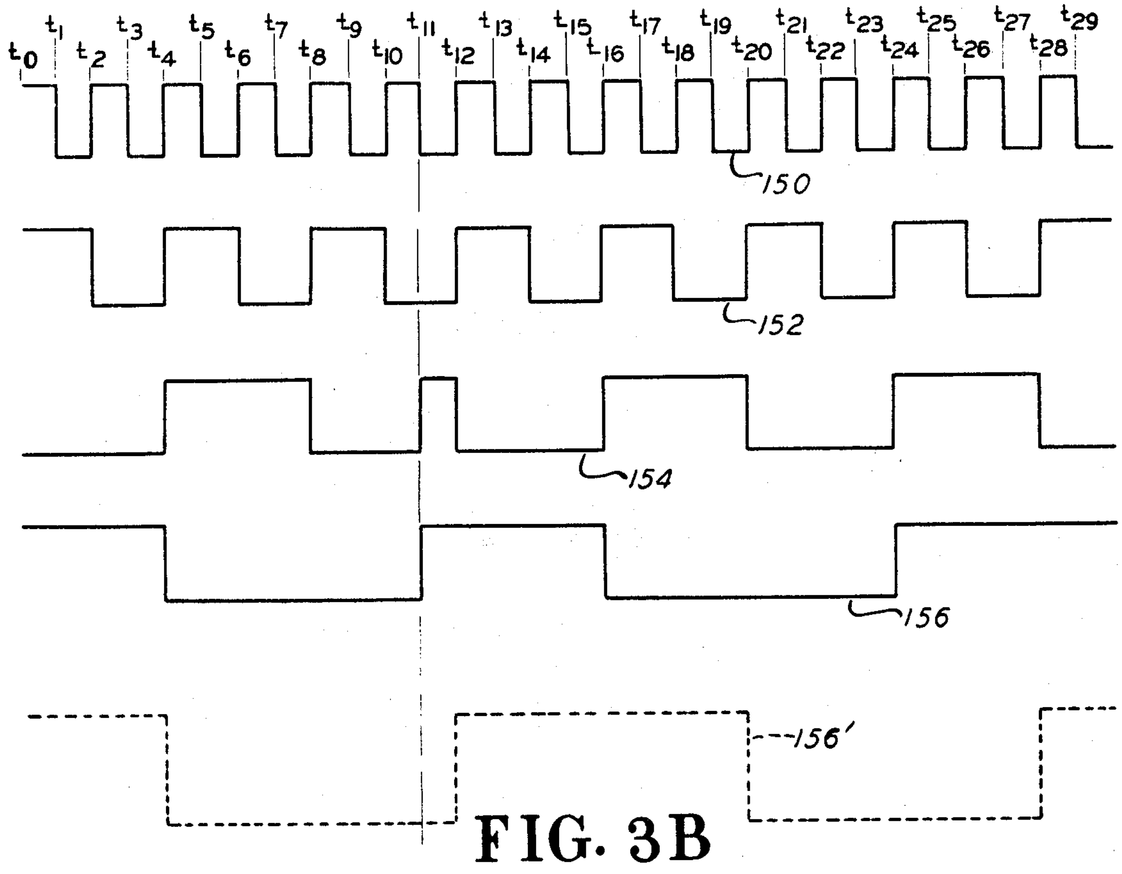

A 90° phase shift of the carrier frequency signal will be described in conjunction with FIGS. 1, 2B and 3B and by assuming that decoder 12 output lead 18 is high and output leads 20 and 16 are low. Waveform 154 of FIG. 3B illustrates the reset output from flip flop 36 in stage 26 of the frequency divider 22, waveform 156 illustrates the carrier frequency output phase shifted by 90° and waveform 156, illustrates the carrier frequency if there were no phase shift. Prior to time *t*11, the frequency divider 22 operates in a manner as described hereinabove in conjunction with FIG. 2A. At time *t*11, the occurrence of the first phase shift pulse 160 on lead 60 has no effect on the NAND gates 112 and 110 since lead 20 is low. As shown by waveform 154, just prior to time *t*11, the flip flop 36 is set. Accordingly, the complimentary flip flop 102 is reset causing its set output appearing on lead 114 to be low which will prevent actuation of NAND gate 106. The high output on lead 116 from the reset side of the complimentary flip flop 102 enables NAND gate 108. As mentioned earlier, lead 18 is high. Accordingly, upon occurrence of the second shift pulse 162, NAND gate 108 is actuated to reset flip flop 36 in a manner substantially identical to that described hereinabove in conjunction with flip flops 38 and 104. As shown by waveform 154 of FIG. 3B, this causes the reset output, which is the input flip flop 38, to go to a positive level from a negative level at time *t*11 i.e., a phase shift of 180°. Actually the switching takes place a short time after time *t*11. However, the time interval is so short that, for purposes of explanation, it will be considered to take place at time *t*11. This positive going potential toggles flip flop 38 which would not normally be toggled until time *t*12 as shown by waveform 156'. Flip flop 36 is toggled at time *t*12 but this change of state now has no effect on flip flop 38. As is now clear, toggling of the flip flop 36 at time *t*11 by actuation of NAND gate 108, changes the times at which flip flop 38 is toggled. As shown by a comparison of waveforms 156 and 156' this results in the carrier frequency being shifted in phase by 90° after time *t*11.

Figure 3C:
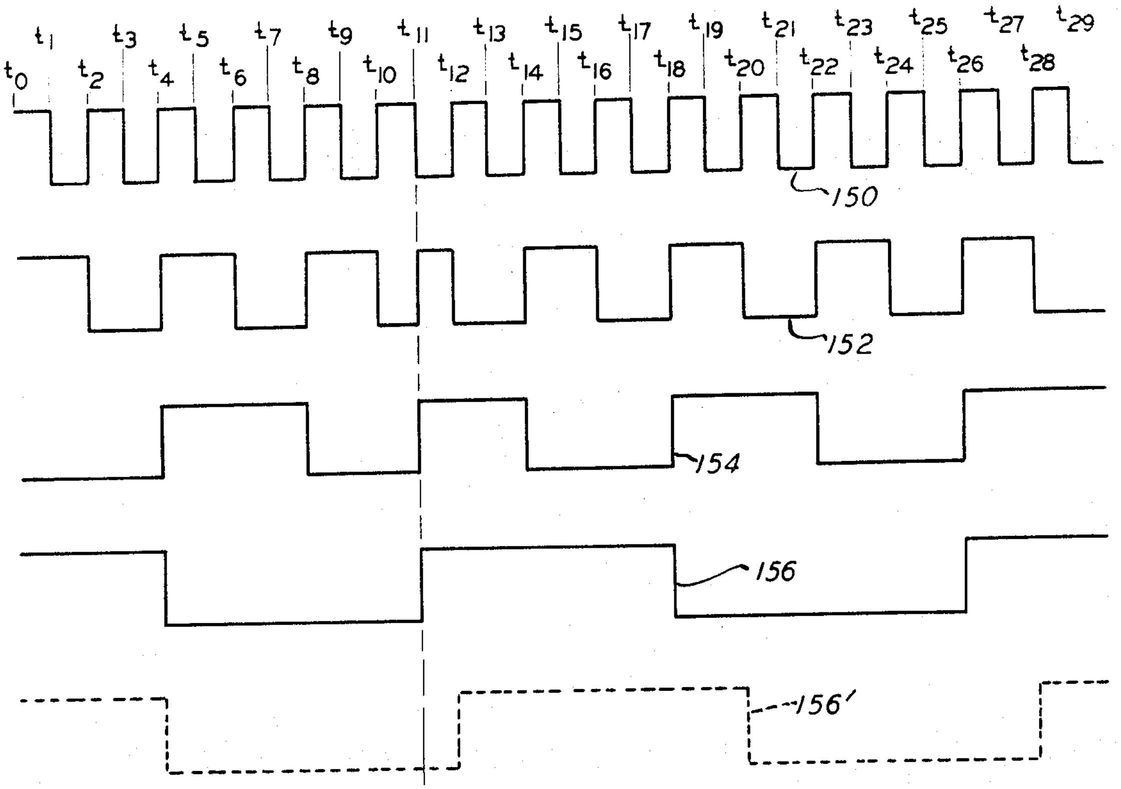

45° phase shift of the carrier frequency signal will be described in conjunction with FIGS. 1, 2A and 3C and by assuming that decoder 12 output lead 16 is high and output leads 18 and 20 are low. Waveform 152 of FIG. 3C illustrates the reset output from flip flop 34 in stage 28 of frequency divider 22, waveform 154 illustrates the reset output from flip flop 36, waveform 156 illustrates the carrier frequency output phase shifted by 45° and waveform 156' illustrates the carrier frequency if there were no phase shift. Prior to time *t*11, the frequency divider 22 operates in a manner as described hereinabove in conjunction with FIG. 2A. At time *t*11, the occurrence of the first phase shift pulse 160 on lead 60 has no effect on the NAND gates 112 and 110 since lead 20 is low. Likewise, the occurrence of the second phase shift pulse 162 on lead 62 has no effect on the NAND gates 106 and 108 since lead 18 is low. As shown by waveform 152 of FIG. 3C, just prior to time *t*11, the flip flop 34 is set. Accordingly, the complimentary flip flop 82 is reset causing its set output appearing on lead 88 to be low which will prevent actuation of NAND gate 78. The high output on lead 90 from the reset side of the complimentary flip flop 82 enables NAND gate 76. Upon occurrence of the third shift pulse 164, NAND gate 76 is actuated to reset flip flop 34 in a manner substantially identical to that described hereinabove. As shown by waveform 152 of FIG. 3C, this causes the reset output to go to a positive level from a negative level at substantially time *t*11. This results in shifting the phase of the frequency signal passing through flip flop 34 by 180°. Reference to FIG. 2A shows that in the absence of any phase shift, that after time *t*10, the flip flop 34 is toggles at times *t*12, *t*14, *t*16, *t*18, *t*20, *t*22, etc., resulting in toggling of flip flop 36 at times *t*12, *t*16, *t*20, *t*24, *t*28, etc., resulting in toggling of flip flop 38 at times *t*12, *t*20, *t*28, etc. FIG. 3C shows that a result of changing the state of flip flop 34 at time *t*11, flip flop 34 still toggles at times *t*12, *t*14, *t*16, *t*18, *t*20, *t*22, etc. However its phase is changed by 180°. Flip flop 36, however, now toggles at time *t*14, *t*18, *t*22, *t*26, etc., which results in flip flop 38 now being toggled at times *t*18, *t*26, etc. A comparison of waveforms 156 and 156' of FIG. 3C shows that this results in the carrier frequency signal being changed by 45° after time *t*11.

Referring now to FIG. 1, assume that the dibits 00 occur at the input to the decoder 12. This is the same as the absence of any data on lead 14. As described above, this results in lead 16 being high with leads 18 and 20 low resulting in a phase shift of the carrier signal 156 on lead 32 of 45°. The occurrence of the dibits 01 will cause leads 16 and 18 to be high and lead 20 to be low. In a manner as described hereinabove in detail, the occurrence of the first shift pulse 160 on lead 60 has no effect. The occurrence of the second shift pulse 162 on lead 62 results in a 90° phase shift of the carrier signal on lead 32. The occurrence of the third shift pulse 164 on lead 64 results in a 45° phase shift which added to the previous 90° phase shift results in shifting the phase of the carrier signal by 135°. In a like manner, the occurrence of the dibits 10 will cause leads 16 and 20 to high and lead 18 to be low. The occurrence of the first shift pulse 160 on lead 60 results in a 180° phase shift of the carrier signal on lead 32, the occurrence of the second shift pulse 162 has no effect, and the occurrence of the third shift pulse on lead 64 results in a pulse shift of 45° which added to the 180° phase shift results in shifting the pahse of the carrier signal by 225°. The occurrence of the dibits 11 will cause all of the leads 16, 18 and 20 to be high. Accordingly, the occurrence of the first shift pulse results in a carrier phase shift of 180°, followed by a phase shift of 90° caused by occurrence of the second shift pulse, followed by a phase shift of 45° upon occurrence of the third shift pulse, which, taken together constitute a total phase shift of the carrier signal by 315°. As is now clear, the apparatus of FIG. 1 will shift the phase of the carrier frequency signal as a function of data information.

Although the apparatus of FIG. 1 can be used as a phase modulator generally, it is particularly useful as a differential phase modulator. As shown in FIG. 1, all switching and timing is tied back to a single source 44, which is crystal controlled, thus making the apparatus of this invention stable with regard to temperature and time. From the above description and the description that follows in conjunction with FIGS. 4, 5, 6 and 7, it will be apparent that the apparatus of FIG. 1 can be economically fabricated with integrated circuits.

As described above, there is no interference between switching of the bistable devices making up the frequency divider by the frequency signal passing therethrough and switching of the bistable devices by the phase shift pulses 160, 162 and 164 since such switching is out of phase. Although four distinct phase shifts of the carrier frequency signal are required to identify the four groups of the dibit data, this is accomplished with the apparatus of the present invention by a frequency divider that has only three stages 24, 26 and 28. By including additional bistable stages between the first frequency signal source 44 and the stage 28, additional phase shifts can be obtained. For example, one additional flip foop would produce a phase shift of 45/2 or 22.5°, still another flip flop a phase shift of 22.5 or 11.25°, and so on. It is noted that the amount of the carrier phase shift produced by any one stage of the frequency divider 22 is determined by its location; with the stage nearest the output producing the greated phase shift and those stages located away from the output producing a progressively smaller phase shift. To prevent a race condition when two or more phase shifts are required to obtain the desired carrier phase shift, the phase shift timing pulses 160, 162 and 164 occur sequentially with the first pulse 160 being applied to the stage 24 adjacent the output of the frequency divider, the next occurring phase shift pulse 162 to the next stage 26, and so on in succession so that the last phase shift pulse 164 is applied to the input stage 28 of the frequency divider 22.

Figure 4:
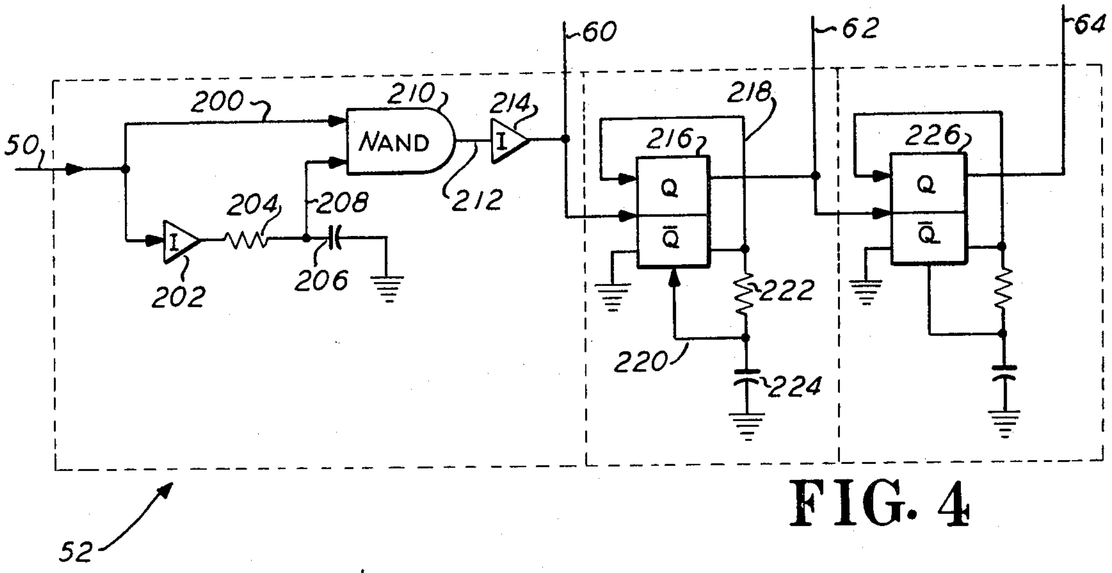
FIG. 4 is a logic diagram of a circuit which may be used as the Phase Shift Timing Pulse Generator shown in block form in FIG. 1.
Figure 5:
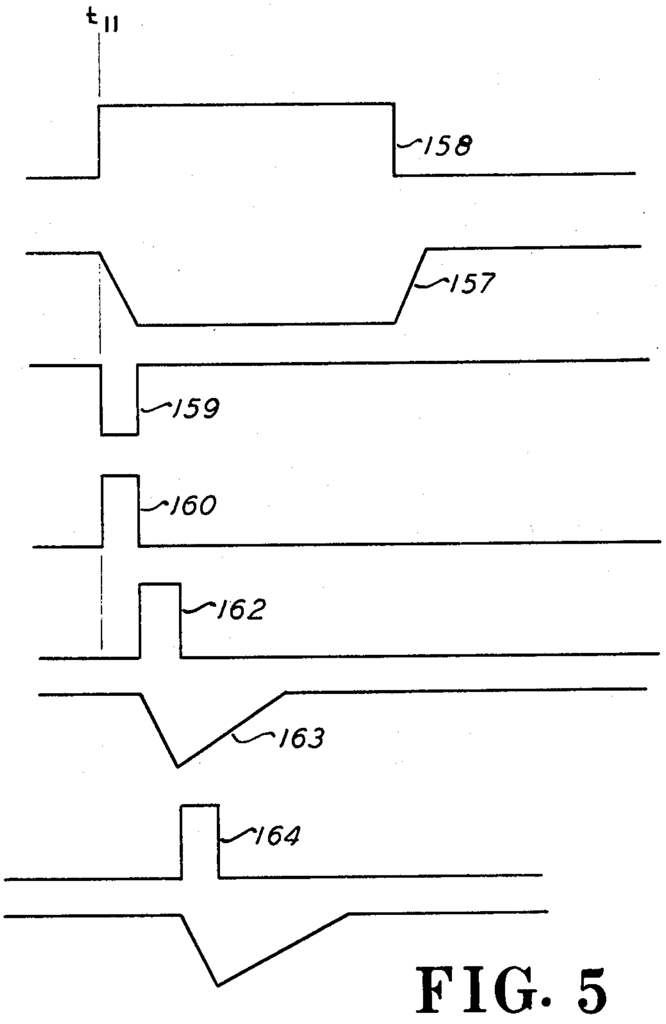
FIG. 5 illustrates a phase and timing diagram for the circuit shown in FIG. 4.

A circuit suitable for use as the phase shift timing pulse generator 52 of FIG. 1 is shown in FIG. 4 as including first stage 54 which receives the 1,200 cycle per second output from the other frequency divider 46 on lead 50. This input is shown in FIG. 5 as waveform 158. The input 158 constitutes one input of a NAND gate 210 and is also inverted by an inverter 202 before being applied to a resistor 204 capacitor 206 network. The potential at the resistor 204 capacitor 206 junction on lead 208 constitutes the other input to NAND gate 210 the output of which is applied to lead 60 by way of an inverter 214. The signal on lead 60 is also coupled as the toggle input to a JK flip flop 216 in second stage 56. The reset output of flip flop 216, in addition to being coupled to the J input by lead 218, is also coupled to a resistor 222 capacitor 224 network with the junction of the resistor and capacitor being coupled back to the clear terminal of the reset side by way of lead 220. The set output of flip flop 216 appears as an output on lead 62 and also as the input to third stage 58 having a JK flip flop 226 connected in a manner as described in conjunction with flip flop 216. The set output of flip flop 226 appears as an output on lead 64. In the absence of an input, each of the flip flops 216 and 226 seek and remain in a reset condition.

Referring now to FIGS. 4 and 5, wherein FIG. 5 illustrates idealized waveforms in the circuit of FIG. 4, it is seen that prior to time *t*11 the 1,200 cycle per second clock pulse on lead 50 is low which causes the input to the NAND gate 210 on lead 200 to be low. This inverted low causes the potential at the jucntion of the resistor 204 and capacitor 206 to be high, as shown by waveform 157 of FIG. 5, to enable the gate 210. However since the other input 158 is low, gate 210 cannot be actuated at this time. At time *t*11, however, the input 158 is a positive going potential causing the input on lead 200 to be high. At the same time, this potential change is inverted by inverter 202, however, the capacitor 206 cannot discharge to a negative level immediately due to circuit resistance as shown by waveform 157. This causes both inputs to the NAND gate to be high for the portion of time that lead 208 is high as shown by FIG. 5. This causes the NAND gate to be actuated for a short period of time producing a narrow, negative, pulse 159 on lead 212 that is inverted by the inverter 214 to produce the first phase shift timing pulse 160 on lead 60 which is coupled to state 24 of the frequency divider of FIG. 1. This pulse 160 is also applied to flip flop 216 which is responsive to a negative going potential. Accordingly, the trailing edge of pulse 160 will set flip flop 216 causing its set output 162 to become positive. Previous to this time, the potential across the capacitor 224 has been positive as shown by waveform 163. When flip flop 216 is set, the reset output is low and, as shown by waveform 163, capacitor 224 cannot discharge immediately to the new potential due to circuit resistance thus keeping flip flop 216 set. As soon as the potential across the capacitor 224 does become negative, however, this potential appears on lead 220 to reset flip flop 216. This setting and resetting of flip flop 216 results in a narrow pulse 162 on lead 62 and constitutes the second phase shift timing pulse that is coupled to stage 26 of the frequency divider of FIG. 1. This pulse is also applied as an input to flip flop 226 which is also responsive to a negative going potential to generate another arrow pulse 164 in a manner substantially identical to that described in conjunction with flip flop 216. This pulse appears on lead 64 and constitutes the third phase shift timing pulse that is coupled to stage 28 of frequency divider 22 of FIG. 1.

As is clear from the above description, the width of the pulses 160, 162 and 164 can be controlled by controlling the values of the associated resistor-capacitor networks. Also, the pulses are generated in sequence with the trailing edge of a preceeding pulse being coincident with the leading edge of a subsequent pulse.

Figure 6:
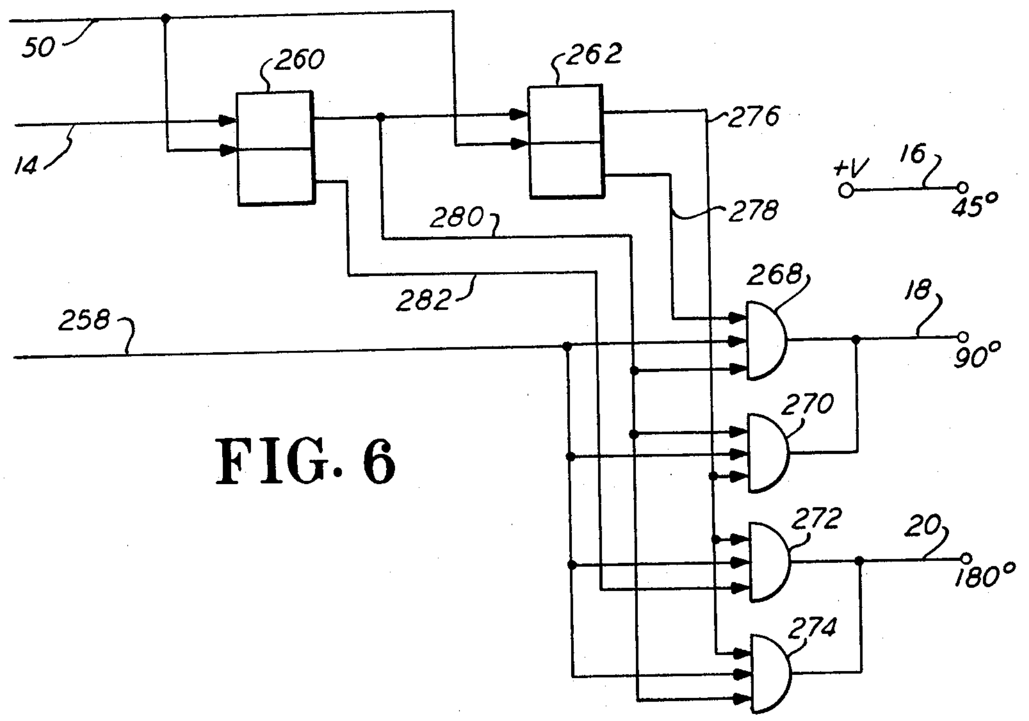
FIG. 6 is a logic diagram of a circuit which may be used as the Converter shown in block form in FIG. 1.
Figure 7:
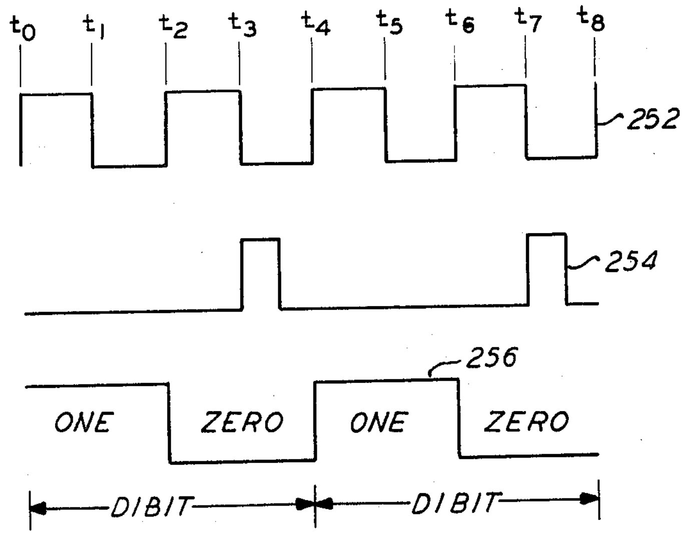
FIG. 7 illustrates a phase and timing diagram for the circuit shown in FIG. 6.

FIG. 6 illustrates a suitable circuit that may be utilized as the decoder 12 of FIG. 1, and FIG. 7, illustrates various idealized waveforms in the circuit of FIG. 6. Referring now to FIGS. 6 and 7, it is seen that the incoming serial dibit data train, shown by way of example as waveform 256, is applied to a two bit shift register, which includes D flip flops 260 and 262, by way of lead 14. Data in the shift register is shifted by a 2,400 cycle per second clock signal, shown in FIG. 6 as waveform 252, which is applied as the toggle input to each of the flip flops 260 and 262 by way of lead 250. The set and reset outputs of the flip flops are coupled to a plurality of AND gates 268, 270, 272 and 274 that convert the dibit data in the flop flops 260 and 262 to one ore more potential levels on predetermined ones of the leads 16, 18 and 20. The plurality of AND gates 268, 270, 272 and 274 are enabled by a 1,200 cycle signal, shown in FIG. 7 as waveform 254 and appearing on lead 258. The clock signal 252 on lead 250 and the clock signal 254 on lead 258 can readily be derived by any number of well known means (not shown) from the crystal controlled source 44 of FIG. 1. Since there is a 45° phase shift of the carrier frequency signal even in the absence of data (dibits 00), the lead 16, representative of a 45° phase shift and coupled to stage 28 of the frequency divider 22 of FIG. 1, is always high and can be directly coupled to a source 284 of positive potential. Lead 18, representative of a 90° phase shift when high, is coupled to stage 26 of the frequency divider and to the output of gates 268 and 270. Lead 20, representative of a 180° phase shift when high, is coupled to stage 24 of the frequency divider and to the output of gates 272 and 274.

The operation of the circuit of FIG. 6 is such that the first bit of a dibit appearing on lead 14 is set into the flip flop 260 by a positive going potential of the clock signal 252 on lead 250. Since the set output of flip flop 260 is coupled to the d input of flip flop 262 by eay of lead 264, and since the same clock 252 is applied as a toggle to both of the flip flops 260 and 262, the second bit of the dibit appearing on lead 14 is set into flip flop 260 during the next positive going portion of the clock signal 252 and at the same time the first bit of the dibit in flip flop 260 is set into flip flop 262. The gates 268, 270, 272 and 274 are now enabled by the clock signal on lead 258 to decode the dibit data in flip flops 260 and 262. For example, the dibits 00 result in both flip flops being reset and none of the gates 268, 270, 272 or 274 actuated. However lead 16 is high and will result in a 45° phase shift. The occurrence of the dibits 01 results in flip flop 262 being reset and flip flop 260 set since the ZERO is the first bit of the dibit and the ONE is the second bit. This causes the reset output from flip flop 262 appearing on lead 278 to be high and the set output from flip flop 260 appearing on lead 280 to be high. When the clock signal 254 on lead 258 is high, gate 268 is actuated to produce a positive potential on lead 18. As described above in detail, leads 16 and 18 being high results in a shift of phase of the carrier frequency by 90° and then 45° for a total phase shift of 135°. The occurrence of the dibits 10 results in flip flop 262 being set and flip flop 260 reset since the ONE is the first bit and the ZERO is the second bit. This causes the set output from flip flop 262 appearing on lead 276 to be high and the reset output from flip flop 260 appearing on lead 282 to be high. When the clock signal on lead 258 is high, gate 272 is actuated to produce a positive potential on lead 20. As described above, leads 20 and 16 being high results in a carrier phase shift of 180° and then 45° for a total phase shift 225°. The occurrence of the dibits 11 results in flip flops 260 and 262 both being set. This causes the set output of flip flop 260 appearing on lead 280 to be high and the set output of flip flop 262 appearing on lead 276 to be high. When the clock signal on lead 258 goes high, gates 270 and 274 are actuated to produce a positive potential on leads 18 and 20. As described above, leads 16, 18 and 20 being high reslts in a carrier phase shift of 180° then 90° and then 45° for a total phase shift of 315°. As will be apparent to those skilled in the art, the clock pulses 254 which enables the gates 268, 270, 272 and 274 are positive for a time period that encompasses the occurrence of the three phase shift timing pulses 160, 162 and 164 described hereinabove.

For purposes of simplicity, FIG. 6 illustrates the output of AND gates being tied to a common lead. As will be apparent to those skilled in the art, this generally is not done. Rather, the outputs are generally coupled to a common lead by way of an OR gate (not shown).

Although the present invention has been described with reference to a particular embodiment thereof, it should be understood that many other modifications and embodiments can be devised by those skilled in the art that fall within the spirit and scope of the present invention as set forth in the appended claims.

What is claimed is:

1. Phase modulation apparatus comprising:

a multistage frequency divider having an input and an output, said input of said frequency divider operable to receive a first frequency signal to provide a second frequency carrier signal at the output of said frequency divider, means for receiving a sequential digital signal;

said means coupled to at least one of said stages of said frequency divider for selectively shifting the phase of said signal passing through said frequency divider in accordance with said digital signals so that the phase of said carrier output signal is a function of the data in said sequential digital signal, a gating means coupled between each stage of said frequency divider and the associated output lead from said digital signal receiving means, said gating means operable to change the stable state of its associated stage when actuated,
phase shift timing means coupled to said gating means in a predetermined sequence with a gating means being actuated by the simultaneous occurrence thereat of a phase shift timing signal and a voltage level from said digital signal receiving means;
a bistable device associated with each stage of said frequency divider,
means coupling said bistable device to its associated stage such that said bistable device attains a stable state opposite to that of its associated stage, and
means coupling said bistable device to said gating means of its associated stage and operable to cause its associated stage to be switched to its other stable state once for each simultaneous occurrence at said gating means of a said phase shift timing signal and a voltage level from said converting means.

2. The apparatus according to claim 1 wherein;
said digital signal includes sequentially occurring binary bits, and
said means includes converter means having an output lead coupled to each stage of said frequency divider and operable to convert at least one of said binary bits at a time into one or more voltage levels indicative of said bits(s) and which voltages level(s) appears on a predetermined one(s) of said output leads.

3. The apparatus according to claim 2 wherein;
each stage of said frequency divider includes a primary binary device.

4. The apparatus according to claim 3 wherein;
switching of a primary bistable device to its other stable state by actuation of its associated gating means changes the phase of the signal passing therethrough by 180° with a resulting change in the phase of said output carrier signal by an amount determined by the location of said primary bistable device in said frequency divider.

5. The apparatus according to claim 4 wherein;
each said primary binary device of said frequency divider is operable to reduce the frequency of a signal applied thereto by half by being switched between its two stable states by said applied signal.

6. The apparatus according to claim 5 wherein;
said phase shift timing means is operable to cause the switching of said bistable devices to be out of phase within the switching of said bistable devices by said frequency signal passing through said frequency divider.

7. Phase modulation apparatus comprising;
a plurality of bistable devices,
each said bistable device operable to reduce the frequency of a signal applied thereto by half by being switched between its two stable states by said applied signal,
means connecting said bistable devices into a serial chain to constitute a frequency divider having an input at one end and an output at the other end thereof,
a first frequency signal source coupled to said input of the frequency divider to provide a second frequency carrier signal at said output of the frequency divider,
gating means coupled to at least some said binary devices for switching the associated binary device to its other stable state when said gating means is actuated;
a serially occurring digit data train source,
converting means having a plurality of outputs and operable to receive said serial data train to produce an output signal on at least one of said outputs which is indicative of the data occurring in a predetermined length of said serial data train,
said gating means associated with said binary devices being coupled to a different one of said converter outputs,
phase shift timing means coupled to said gating means for providing sequentially occurring timing signals to enable said gating means in a predetermined sequence to selectively shift the phase of the signal passing through said frequency divider in accordance with said converter output so that the phase of said carrier output signal is a function of the data in said serial data train; wherein
the sequence of enabling said gating means begins with the gating means associated with the bistable device at the output end of said frequency divider and ends with the gating means associated with the bistable device at the input end of said frequency divider.

8. The apparatus according to claim 7 wherein;
said data train includes binary ONE's and ZERO's and
said converting means output is indicative of a plurality of said binary bits at a time.

9. The apparatus according to claim 7 wherein;
switching of a bistable device by its associated gating means changes the phase of the singal passing through said bistable device by 180° with a resulting change in phase of said output carrier signal by an amount determined by the location of said bistable device in said frequency divider.

10. The apparatus according to claim 7 wherein;
said phase shift timing signals occur out of phase with the switching of the bistable devices by the frequency signal passing through said frequency divider.

11. Phase modulation apparatus comprising:
a plurality of bistable devices,
each said bistable device operable to reduce the frequency of a signal applied thereto by half by being switched between its two stable states by said applied signal,
means connecting said bistable devices into a serial chain to constitute a frequency divider having an input at one end and an output at the other end thereof,
a first frequency signal source coupled to said input of the frequency divider to provide a second frequency carrier signal at said output of the frequency divider,
gating means coupled to at least some said binary devices for switching the associated binary device to its other stable state when said gating means is actuated;
a serially occurring digit data train source,
converting means having a plurality of outputs and operable to receive said serial data to produce an output signal on at least one of said outputs which is indicative of the data occurring in a predetermined length of said serial data train, said gating means associated with said binary devices being coupled to a different one of said converter outputs, phase shift timing means coupled to said gating means for providing sequentially occurring timing signals to enable said gating means in a predetermined sequence to selectively shift the phase of the signal passing through said frequency divider in accordance with said converter output so that the phase of said carrier output signal is a function of the data in said serial data train;

another bistable device coupled to each said bistable device of said frequency divider and operable to be in a stable state opposite to that of its associated said bistable device, said gating means being actuated upon the simultaneous occurrence thereafter of an output from said converting means and a phase shift timing signal, and means coupling said other bistable device to the gating means of its associated said bistable device and operable to prevent switching of the associated said bistable device more than once for each actuation of the associated said gating means.

* * * * *